US012609633B2

(12) United States Patent
Wyss et al.

(10) Patent No.:  US 12,609,633 B2
(45) Date of Patent:  Apr. 21, 2026

(54) MULTI-LEVEL POWER CONVERTER WITH IMPROVED CLAMPING FUNCTIONALITY

(71) Applicant: B&R Industrial Automation GmbH, Eggelsberg (AT)

(72) Inventors: Jonas Wyss, Zurich (CH); Florian Höller, Obertrum am See (AT); Franz Maislinger, Mattighofen (AT)

(73) Assignee: B&R Industrial Automation GmbH, Eggelsberg (AT)

( * ) Notice: Subject to any disclaimer, the term of this patent is extended or adjusted under 35 U.S.C. 154(b) by 208 days.

(21) Appl. No.: 18/673,486

(22) Filed: May 24, 2024

(65) Prior Publication Data

US 2024/0396470 A1    Nov. 28, 2024

(30) Foreign Application Priority Data

May 24, 2023    (AT) .............................. A 50411/2023

(51) Int. Cl.
H02M 7/483        (2007.01)
H02M 1/00        (2007.01)
        (Continued)

(52) U.S. Cl.
CPC ....... *H02M 7/4835* (2021.05); *H02M 1/0095* (2021.05); *H02M 1/083* (2013.01); *H02M 7/487* (2013.01)

(58) Field of Classification Search
CPC ... H02M 1/0095; H02M 3/158; H02M 7/4835
See application file for complete search history.

(56) References Cited

U.S. PATENT DOCUMENTS

| | | | |
|---|---|---|---|
| 11,056,972 B2 * | 7/2021 | Philip ................... | H02M 3/157 |
| 2016/0352251 A1 | 12/2016 | Li et al. | |
| 2021/0067057 A1 * | 3/2021 | Abarzadeh .......... | H02M 7/4837 |

FOREIGN PATENT DOCUMENTS

| | | | |
|---|---|---|---|
| CA | 3181128 A1 * | 12/2021 | .......... H02M 1/0095 |
| CN | 113783451 A | 12/2021 | |

(Continued)

OTHER PUBLICATIONS

El Jihad et al., PWM Gain Linearization Algorithm for Medium Voltage Source Inverter. EPE'20 ECCE Europe, IEEE. 10 pages, (2020).

(Continued)

*Primary Examiner* — Gary A Nash
(74) *Attorney, Agent, or Firm* — McCarter & English, LLP

(57)        ABSTRACT

In order to provide an improved method for operating a multi-level power converter, a lower threshold value, an upper threshold value above the lower threshold value, and an inflection value between the lower threshold value and the upper threshold value are determined, and in the event that a predefined time signal of a target output voltage passes the inflection value at a first inflection time point, passes the inflection value a further time at a second inflection time point subsequent to the first inflection time point and, between the first inflection time point and the second inflection time point, passes neither the lower threshold value nor the upper threshold value nor the inflection value, a clamping mode of the multi-level power converter is activated as of the second inflection time point.

12 Claims, 7 Drawing Sheets

(51) Int. Cl.
H02M 1/08 (2006.01)
H02M 7/487 (2007.01)

(56) References Cited

FOREIGN PATENT DOCUMENTS

EP 2415147 A2 2/2012
EP 2871765 A1 5/2015
EP 4106176 A1 12/2022

OTHER PUBLICATIONS

Quan et al., Multilevel Voltage-Source Converter Topologies With Internal Parallel Modularity. IEEE Transactions on Industry Applications. 2020;56(1):378-389.

Song et al., Elimination of Abnormal Output Voltage in a Hybrid Active NPC Inverter. IEEE Transactions on Power Electronics. May 2021;36(5):5348-5361.

Steffen et al., Current distortion study for hybrid multi-level grid inverter with active neutral-point-clamped 4-Leg topology. EPE'22 ECCE Europe, IEEE. 10 pages, (2022).

European Office Action for Application No. 24177748.1, dated Oct. 16, 2024, 10 pages.

\* cited by examiner

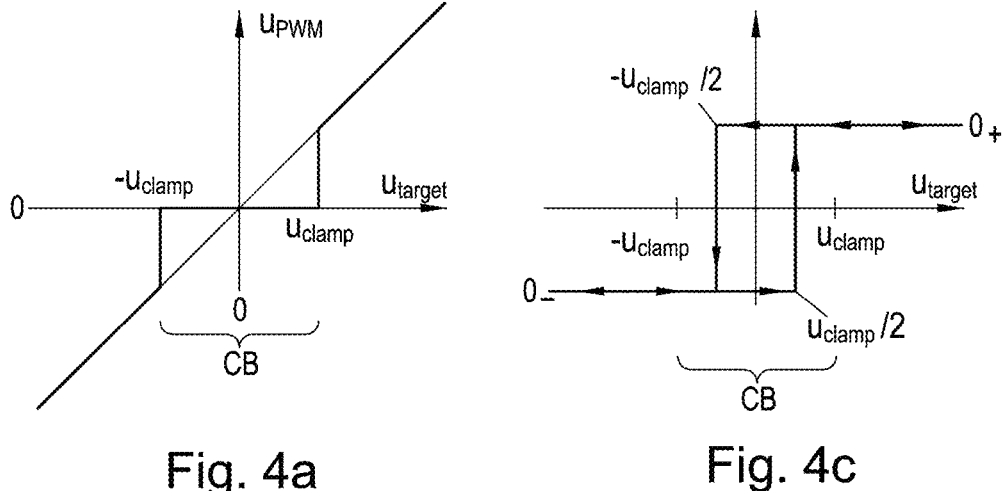
Fig. 4a
Fig. 4c
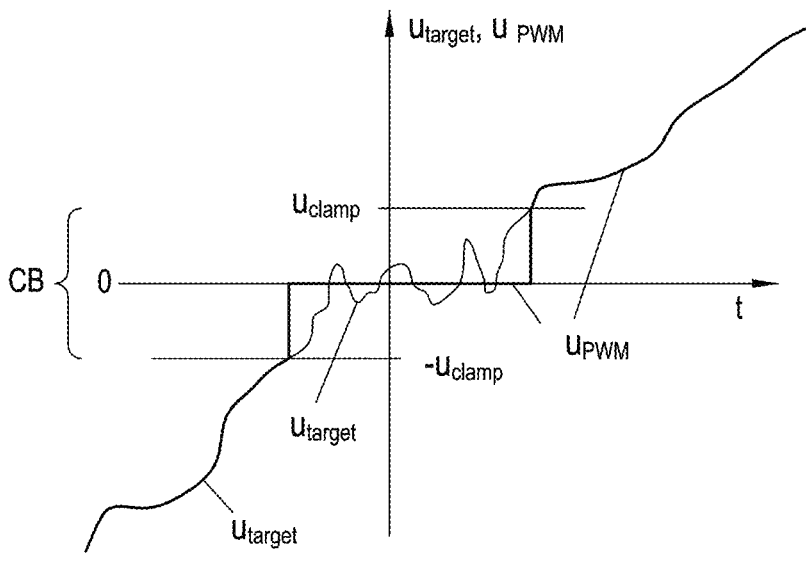
Fig. 4b

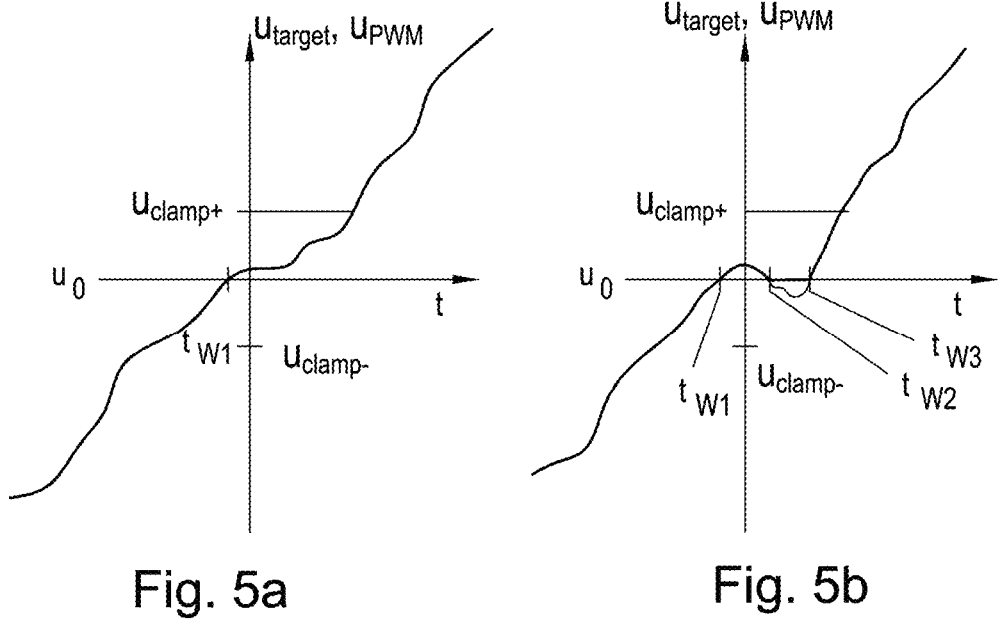
Fig. 5a                  Fig. 5b
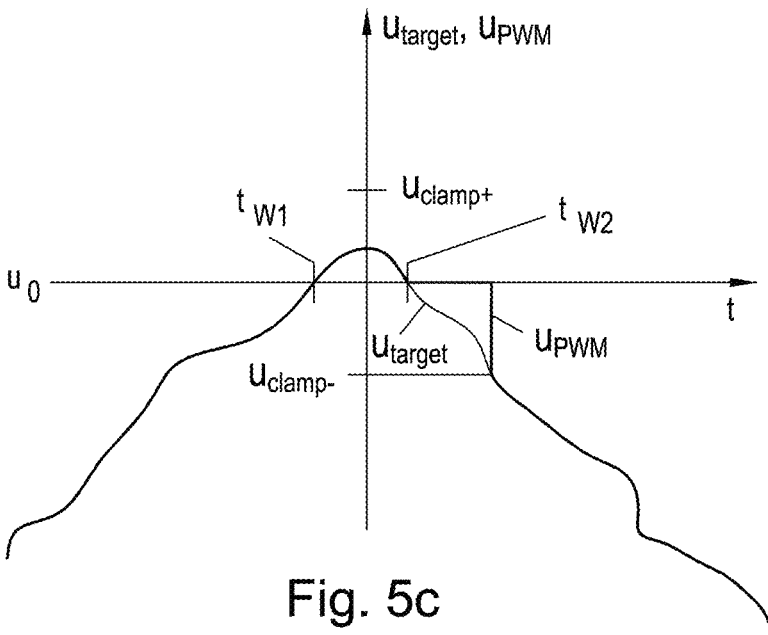
Fig. 5c

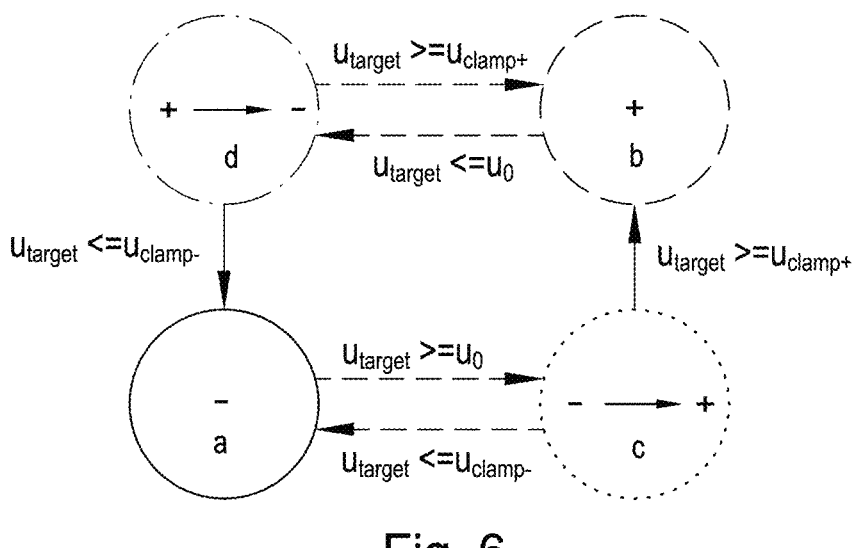
Fig. 6
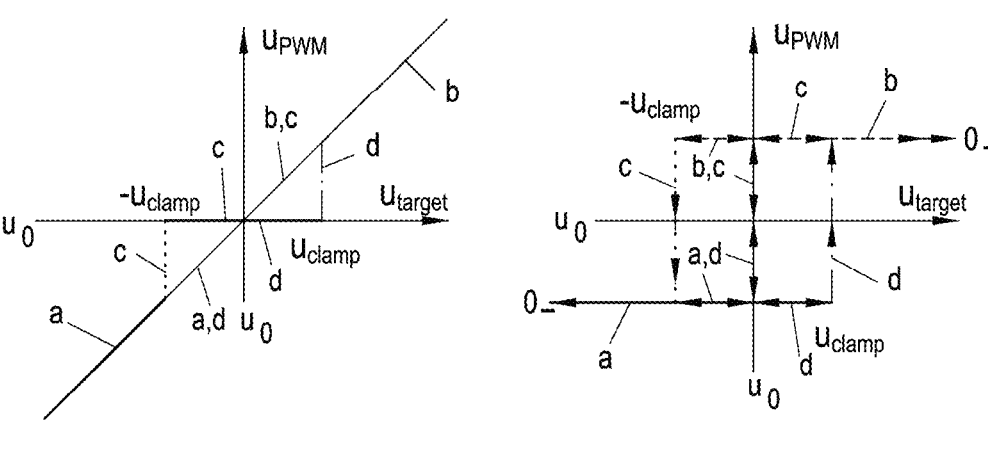
Fig. 7a                    Fig. 7b

MULTI-LEVEL POWER CONVERTER WITH IMPROVED CLAMPING FUNCTIONALITY

CROSS REFERENCE TO RELATED APPLICATIONS

This patent application claims the benefit and priority of Austrian Patent Application No. A50411/2023 filed on May 24, 2023, the disclosure of which is incorporated by reference herein in its entirety as part of the present application.

BACKGROUND

The present disclosure relates to a method for operating a multi-level power converter, wherein a temporal sequence of at least three voltage levels which can be output at an output of the multi-level power converter is determined from a predefined time signal of a target output voltage and is output at the output of the multi-level power converter by switching a plurality of semiconductor switches of the multi-level power converter. The disclosure further relates to a multi-level power converter having at least three voltage levels which can be output at an output.

Power converters, such as rectifiers, inverters, and converters, play key roles in a wide variety of technological fields of application. Feeding solar energy into the grid, high-voltage direct-current transmission, electrical drive trains and automotive test bench technology are just a few examples where the amplitude, frequency or phase of currents and voltages have to be adjusted to predefined target values by means of power converters while meeting high accuracy requirements. Although the field of power converter technology has been the subject of intensive research for some time, demands for high control accuracy combined with high temporal rates of change of target variables, for low residual ripple in the generated output variables or for small structural sizes of the components used are constantly leading to new technological challenges.

In many cases, multi-level power converters are used to meet these requirements. Multi-level power converters are known in various designs and topologies. A multi-level power converter includes at least one switching stage having a plurality of semiconductor switches, wherein more than two voltage levels can be generated at the output of the switching stage in a multi-level power converter. Various topological implementations of multi-level power converters are known from the relevant literature, of which NPC ("neutral point clamped") multi-level power converters and ANPC ("active neutral point clamped") multi-level power converters are particularly prevalent. In the case of NPC and ANPC multi-level power converters, an input voltage provided to the multi-level power converter is divided into a plurality of partial voltages in order to generate a plurality of voltage levels which can be output at the output of the multi-level power converter.

In addition to (A) NPC multi-level power converters, multi-level power converters in flycap topology are increasingly attracting attention. Multi-level power converters in flycap topology include, in addition to a plurality of semiconductor switches, a plurality of capacitors referred to as auxiliary capacitors or flycaps. The auxiliary capacitors provide a, corresponding to their number, plurality of voltage levels, which can be output at an output of the multi-level power converter depending on the switching positions of the semiconductor switches of the multi-level power converter.

Another modern and promising power converter topology is the so-called HANPC topology ("hybrid active neutral point clamped"), which essentially provides a combination of the aforementioned approaches, usually a combination of dividing the input voltage provided (NPC, ANPC) with the use of auxiliary capacitors (flycap topology). Multi-level power converters in HANPC topology allow a sometimes significant increase in the voltage levels that can be output due to the combination of two measures for generating a plurality of voltage levels. These relationships are well known to a person skilled in the art of power converter technology, for example from documents EP 4 106 176 A1, EP 2 871 765 A1, US 2016/0352251 A1 and CN 113783451 A.

If, as is common in power converter technology, the well-known method of pulse-width modulation (PWM) is used to generate time signals of electrical output variables, then the plurality of voltage levels available in multi-level power converters can be used to advantage. A PWM is typically assumed to be a predefined time signal of a target output voltage, which signal defines a voltage-time area in relation to a predefined time interval, in particular in relation to control periods recurring at a control frequency of the PWM.

Based on a predefined voltage-time area, it is known that one aims to determine a temporal sequence of the voltage levels provided by the multi-level power converter and to output this determined temporal sequence of voltage levels at an output of the multi-level power converter by switching the semiconductor switches of the multi-level power converter in such a way that the voltage-time area created by the sequence of voltage levels that is output corresponds as exactly as possible to that voltage-time area generated by the predefined target output voltage time signal in an identical time interval. In order to determine the aforementioned temporal sequence of voltage levels that can be output from a predefined time signal of a target output voltage, a variety of approaches are known, such as symmetrical PWM methods or asymmetrical PWM methods or random PWM methods, which can also be used with multi-level power converters without difficulty. Due to the higher number of voltage levels compared to conventional 2-level converters, in the case of multi-level power converters, in many cases voltage levels that are closer to the values predefined by a predefined time signal of a target output voltage can be used. In practical implementation, various advantages can thus be realized, such as a higher accuracy, i.e., a higher correspondence of the aforementioned voltage-time areas, a lower residual ripple of the generated output voltage, and lower switching losses.

However, a large number of voltage levels is not exclusively associated with advantages. Specifically, problems arise particularly when outputting the voltage levels mentioned, since in a multi-level power converter a single voltage level can typically be implemented by a plurality of switching patterns, i.e., by a plurality of switch positions of the semiconductor switches provided in the multi-level power converter. During the operation of a multi-level power converter, it must therefore be continuously decided which switching pattern is actually used to realize a voltage level whose output is required, e.g., as part of a PWM.

In certain situations, it may even be necessary to switch between a plurality of switching patterns of the semiconductor switches provided in the multi-level power converter within a period of time in which a voltage level required by a PWM is to be output. With regard to multi-level power converters in flycap topology, EP 4 106 176 A1 discloses an operating concept in which switching pattern changes within a voltage level are used.

In the multi-level power converters in HANPC topology mentioned at the outset, switching pattern changes within a voltage level, i.e., during an uninterrupted output of a single voltage level, are required in particular if a predefined time signal of a target output voltage changes its sign in the course of a zero crossing. The reason for this is that, in the case of multi-level power converters in HANPC topology, typically there are at least two possible so-called zero switching patterns that allow the output of the voltage value zero (0V). A first zero switching pattern is typically used to generate negative voltage-time areas as part of a PWM, while a second zero switching pattern is used to implement positive voltage-time areas. If a symmetrical PWM is used, in which, at the edges of the control periods, the according to the absolute value lower voltage levels (in particular 0V) and, symmetrically around the middle of the control periods, the according to the absolute value higher voltage levels (e.g., "$u_{dc}/8$") of the voltage levels used in the course of the PWM are output, the following scenario can occur: If a slightly negative target output voltage is required in a first of two consecutive control periods, whereas a slightly positive target output voltage is required in the second control period, the according to the absolute value lower voltage level of zero (0V) must always be output at the edges of the two control periods. However, since a slightly negative value is required in the first control period, which is to be implemented with the first zero switching pattern, and a slightly positive value is required in the second control period, which is to be implemented with the second zero switching pattern, a change of switching patterns within a voltage level is required at the boundary between the aforementioned control periods, specifically from the first zero switching pattern to the second zero switching pattern, within the 0V voltage level.

In multi-level power converters in HANPC topology, such zero crossings of the required target output voltage and the associated sign changes represent one of the most complicated processes, since this requires all semiconductor switches to be switched synchronously, in particular to avoid short circuits and associated outliers in the generated output voltage. In practice, however, it is not possible to guarantee exactly synchronous switching of a plurality of semiconductor switches, due to, inter alia, component tolerances, changes in the switching behavior due to aging or other signs of wear. Another important reason for asynchronous switching in multi-level power converters in HANPC topology is that different types of semiconductor switches, which have different switching times, are usually used in the different stages of a multi-level power converter in HANPC topology. Specifically, IGBTs (insulated-gate bipolar transistors) with switching times of approximately 100 ns are typically used in an ANPC stage, whereas MOSFETs (metal-oxide-semiconductor field-effect transistors) with switching times of approximately 10 ns are typically used in a flycap stage. Different switching times mean that switching processes in the different switches are processed at different speeds, so that the required synchrony cannot be consistently guaranteed during a switching process that begins at the same time. This can result in undesired current paths, so that outliers ("spikes", i.e., output voltage values that are particularly high compared to the required value) can occur in the generated output voltages at zero crossings.

Such outliers result in (switching) losses and EMC interference, which is why the aim when operating multi-level power converters is to keep the number of switching pattern changes within a voltage level, but in particular within the 0V voltage level, to a minimum. However, a predefined target output voltage whose voltage-time area is to be reproduced by means of a sequence of voltage levels typically does not have a smooth curve, for example if the target output voltage is used as a manipulated variable by a higher-level controller when controlling a noisy current, for example, and is predefined by this controller. In such a scenario, the time profile of a target output voltage can sometimes be subject to strong fluctuations and can fluctuate around the value zero and thus change its sign, in particular in according to the absolute value small values. Without countermeasures, this can lead to many switching pattern changes in a short time and thus also to many spikes in a short time.

This problem is known in the state of the art and may be solved by the so-called clamping method. In this method, a required target output voltage in a predefined range ("clamping range") is simply replaced by the value zero ("clamped to 0"), and the value zero is used, instead of the target output voltage lying in the clamping range, to determine the sequence of voltage levels that is to be output. In this way, fluctuations around the value are simply ignored and it is prevented that a plurality of successive sign changes of a target output voltage occurs, resulting in a plurality of outliers, for example due to a fluctuating target output voltage with many switching pattern changes in a short time.

Although the approach described in the state of the art keeps the number of switching pattern changes to be carried out within a voltage level low, it is not ideal, in particular in terms of the accuracy that can be achieved. According to the state of the art, zero crossings inevitably lead to distortions of the generated voltage-time areas or the associated output voltage, which is not acceptable in many applications.

BRIEF DESCRIPTION

It is therefore an aspect of the present disclosure to improve the operating behavior of a multi-level power converter in the event of sign changes of a predefined target output voltage.

This problem is solved by the features of the independent claims. Specifically, the independent claims for a multi-level power converter as mentioned at the outset provide for determining a lower threshold value, an upper threshold value above the lower threshold value, and an inflection value which is between the lower threshold value and the upper threshold value and which may correspond to the value zero and, in an example manner, is between the lower threshold value and the upper threshold value in the arithmetic center. According to the disclosure, in the event that the predefined time signal of the target output voltage passes the inflection value at a first inflection time point, passes the inflection value a further time at a second inflection time point subsequent to the first inflection time point and, between the first inflection time point and the second inflection time point, passes neither the lower threshold value nor the upper threshold value nor the inflection value, a clamping mode of the multi-level power converter is activated as of the second inflection time point, wherein in the clamping mode of the multi-level power converter, instead of the time signal of the target output voltage, the inflection value is used to determine the sequence of the at least three voltage levels which is output at the output of the multi-level power converter by the switching of the plurality of semiconductor switches. If the inflection value corresponds to the value zero, the inflection value can be realized in an advantageous manner by a first zero switching pattern of the plurality of semiconductor switches of the multi-level power converter and by a second zero switching pattern of the plurality of semiconductor switches of the multi-level power converter.

Compared to methods known from the state of the art, the method according to the disclosure has the advantage that clamping, i.e., replacing the required target output voltage with the inflection value, within the scope of the disclosure only occurs if this is in fact unavoidable, taking all circumstances into account. In this regard, it was recognized in the course of the disclosure that scenarios exist in which a sign change and an associated change between zero switching patterns cannot be prevented. According to the disclosure, the target output voltage is not changed in such cases, which allows significant improvements in the operating behavior of a multi-level power converter, such as, in particular, avoiding unnecessary corruptions or distortions of a generated output voltage compared to a predefined target output voltage.

If the inflection value corresponds to the value zero, a first zero switching pattern can be used within the scope of the disclosure to output the inflection value when a target output voltage, instead of which the inflection value is used to determine the output sequence of the at least three voltage levels, is above the inflection value, and a second zero switching pattern can be used to output the inflection value when a target output voltage, instead of which the inflection value is used to determine the output sequence of the at least three voltage levels, is below the inflection value. Depending on the specific application, the assignment of zero switching patterns to replaced target output voltages can also be realized in reverse, so that the disclosure can be adapted to individual situations with a high degree of flexibility.

A particularly advantageous embodiment of the present disclosure results from the use of a state machine. In this case, a state machine with at least four states a, b, c, d can be provided, whose state a is activated when a negative target output voltage below the lower threshold value is present, whose state b is activated when a positive target output voltage above the upper threshold value is present, whose state c is activated when the negative state a is exited by the target output voltage reaching or passing the inflection value, and whose state d is activated when the positive state b is exited by the target output voltage reaching or passing the inflection value. If such a state machine is used, the clamping mode can be activated and the predefined target output voltage can be replaced by the inflection value when the target output voltage passes the inflection value a further time within the states c or d.

As will be explained in detail below, implementing the present disclosure by means of a state machine offers the possibility for particularly efficient realization, which requires only low computing capacities and can also be implemented simply and reliably on computer architectures with low memory and high clock rates.

Furthermore, in order to exit a clamping mode activated according to the disclosure, the predefined time signal of the target output voltage can advantageously always be used to determine the sequence of the at least three voltage levels output at the output of the multi-level power converter when the target output voltage is below the lower threshold value or above the upper threshold value. A specification of this kind offers an easy-to-implement option for defining states in which no clamping takes place.

In a further, particularly advantageous embodiment of the disclosure, the clamping mode is also deactivated again when the predefined time signal of the target output voltage passes the inflection value a further time after the second inflection time point or when the predefined time signal of the target output voltage passes the lower threshold value or the upper threshold value after the second inflection time point. After deactivating the clamping mode, the predefined time signal of the target output voltage is advantageously used again to determine the sequence of the at least three voltage levels output at the output of the multi-level power converter. In this way, even in the event of the clamping mode being activated, the duration that the clamping mode is active can be reduced to a minimum.

In a further, particularly efficient embodiment of the disclosure, the clamping mode can be activated at a current point in time during operation of the multi-level power converter, and the inflection value can consequently be used to determine the sequence of the at least three voltage levels of the multi-level power converter which is output by the switching of the plurality of semiconductor switches at the output of the multi-level power converter, if the number of inflection time points between the current point in time and the last point in time at which the target output voltage was greater than the upper threshold value or was less than the lower threshold value is even-numbered. If the disclosure is implemented in this way, only the number of passages of the inflection value has to be counted, while the target output voltage remains within the predefined threshold values, which in practice can be done in a particularly computing time- and capacity-saving manner.

Furthermore, the aforementioned aspect is achieved by a multi-level power converter mentioned at the outset, which includes a control unit as well as an input, an output and a plurality of semiconductor switches, wherein the control unit is designed to determine a temporal sequence of at least three voltage levels, which can be output at an output of the multi-level power converter, from a predefined time signal of a target output voltage and to control the plurality of semiconductor switches of the multi-level power converter as a function of the determined sequence of voltage levels in order to output the determined sequence of voltage levels at the output of the multi-level power converter. According to the disclosure, the aforementioned lower threshold value, the upper threshold value above the lower threshold value, and the inflection value between the lower threshold value and the upper threshold value are stored in the control unit, wherein, the control unit is designed to activate, in the event that the predefined time signal of the target output voltage passes the inflection value at a first inflection time point, passes the inflection value a further time at a second inflection time point subsequent to the first inflection time point and, between the first inflection time point and the second inflection time point, passes neither the lower threshold value nor the upper threshold value nor the inflection value, a clamping mode of the multi-level power converter as of the second inflection time point, and, in the clamping mode of the multi-level power converter, to use the inflection value, instead of the time signal of the target output voltage, to determine the sequence of the at least three voltage levels which is output by the switching of the plurality of semiconductor switches at the output of the multi-level power converter.

BRIEF DESCRIPTION OF THE DRAWINGS

The present disclosure is described in greater detail below with reference to FIGS. 1 to 8, which show schematic and non-limiting advantageous embodiments of the disclosure by way of example. In the drawings:

FIGS. 4a, 4b, and 4c show characteristic graphs used in the context of clamping according to the state of the art, and a possible time signal of an output voltage;

FIGS. 5a, 5b, and 5c show exemplary graphs of a target output voltage within the scope of the disclosure;

FIG. 6 shows an implementation of the disclosure as a state machine;

FIGS. 7a and 7b show an implementation of the disclosure using characteristic graphs.

DETAILED DESCRIPTION

Figure 1:
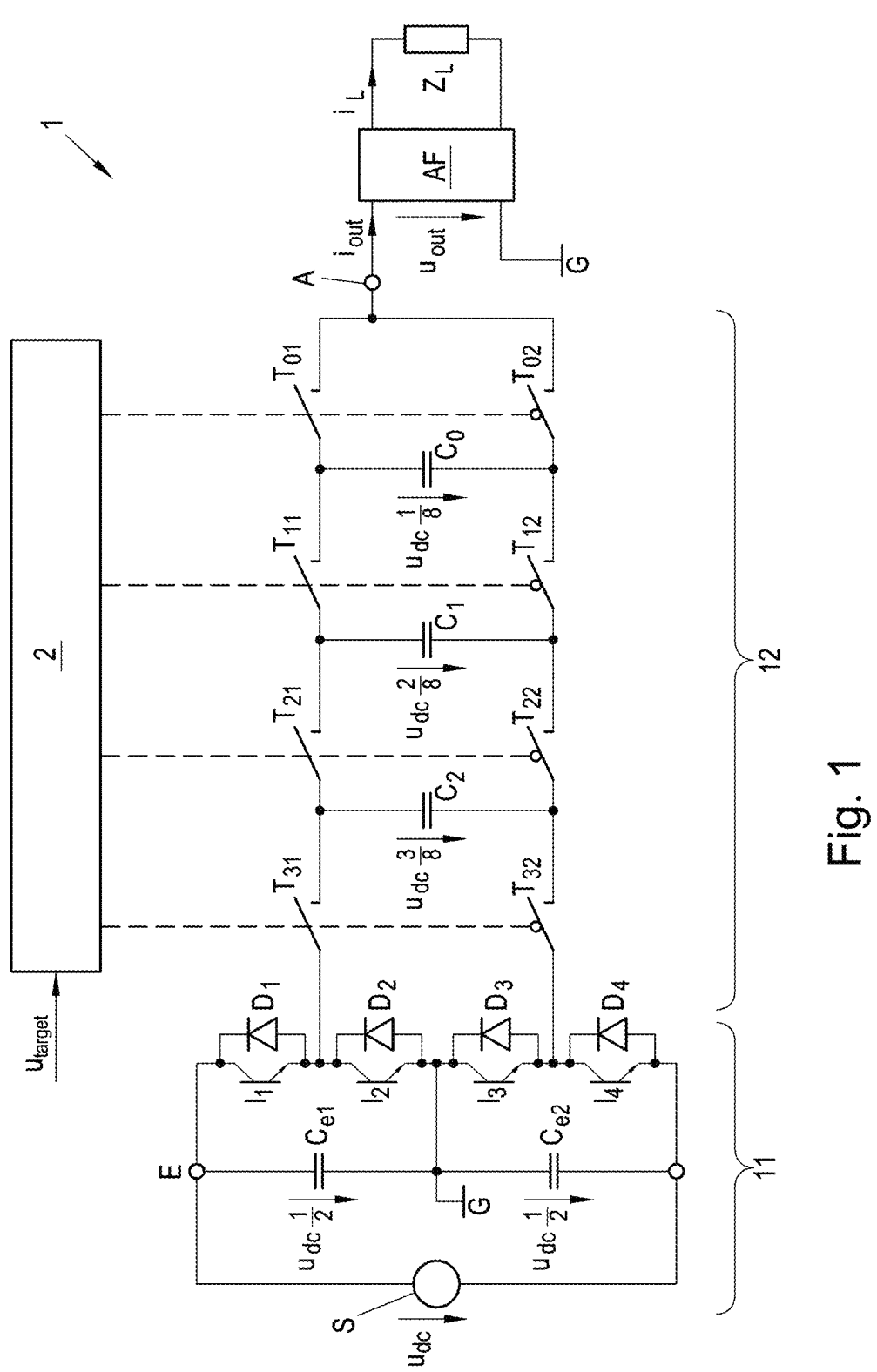
FIG. 1 shows a schematic representation of a HANPC power converter with output filter.

FIG. 1 shows a schematic representation of a multi-level power converter 1 in HANPC topology, here in the form of a 9-level power converter. However, the number of possible voltage levels is not relevant to the disclosure, although more than two, i.e., at least three, voltage levels are in any case possible with a multi-level converter.

A voltage source S connected to the input E of the multi-level power converter 1 supplies the multi-level power converter 1 with an input voltage $u_{dc}$. The input voltage $u_{dc}$ may be given in the form of a DC voltage (DC supply). In the event of the multi-level power converter 1 being supplied with DC voltage, the voltage source S can in particular be designed as a rectifier or as a DC link or other DC voltage source. If a multi-level power converter to which the method according to the disclosure is applied has a different topology, other connection points for a voltage source S and thus as input E are also conceivable.

The 9-level power converter 1 shown includes an ANPC stage 11 and a flycap stage 12. The input and output voltages occurring in the 9-level power converter 1 also relate equally to the reference potential G. In the ANPC stage 11 in question, two input capacitors $C_{e1}$, $C_{e2}$ are provided for dividing the voltage $u_{dc}$ provided by the source S, and four semiconductor switches $I_1$, $I_2$, $I_3$, $I_4$ are provided as input switches, with a freewheeling diode $D_1$, $D_2$, $D_3$, $D_4$ being connected in parallel to each of the input switches $I_1$, $I_2$, $I_3$, $I_4$.

The present flycap stage 12 has three auxiliary capacitors $C_0$, $C_1$, $C_2$ and eight semiconductor switches $T_{01}$, $T_{02}$, ... $T_{31}$, $T_{32}$. Five voltage levels can be provided by the flycap stage 12 alone, and three voltage levels can be provided by the ANPC stage 11 alone. As stated earlier, the interaction of the ANPC stage 11 with the flycap stage 12 increases the number of voltage levels which can be output at the output A of the 9-level power converter 1, in this case, in accordance with the designation of the multi-level power converter 1, to 9 voltage levels 0 which can be output, $$\pm u_{dc} \cdot \frac{1}{8}, \pm u_{dc} \cdot \frac{2}{8}, \pm u_{dc} \cdot \frac{3}{8}, \pm u_{dc} \cdot \frac{4}{8}.$$

When implementing the flycap stage 12, in particular the number of auxiliary capacitors $C_0$, $C_1$, $C_2$ can be varied. Specifically, within the scope of the disclosure, a larger or a smaller number of auxiliary capacitors $C_0$, $C_1$, $C_2$ are also conceivable, which can be connected to one another in a different way. However, at least one auxiliary capacitor is necessary. The embodiment of the ANPC stage 11 can also be varied; specifically, a predefined supply voltage $u_{dc}$ can be divided into more than two partial voltages $u_{dc}1/2$, with several of them in the ANPC stage 11 being assigned a fixed potential, i.e., they can be clamped. In general, any NPC topologies and/or any ANPC topologies and/or any topologies derived from an ANPC topology can be used as the ANPC stage 11.

In order to selectively connect the voltage source S, the auxiliary capacitors $C_0$, $C_1$, $C_2$ and the output A depending on the required voltage level, the semiconductor switches $I_1$, ..., $I_4$, $T_{01}$, $T_{02}$, ... $T_{31}$, $T_{32}$ are opened and closed. The semiconductor switches $I_1$, ..., $I_4$, $T_{01}$, $T_{02}$, ... $T_{31}$, $T_{32}$ can be realized by transistors of a wide variety of types, with IGBTs (insulated-gate bipolar transistors), for example, being used to implement the input switches $I_1$, $I_2$, $I_3$, $I_4$ provided in the ANPC stage 11, whereas primarily field effect transistors (FETs), such as MOSFETs or JFETs, are used to implement the semiconductor switches $T_{01}$, $T_{02}$, ... $T_{31}$, $T_{32}$ provided in the flycap stage 12. The semiconductor switches $T_{k1}$, $T_{k2}$ of the flycap stage 12—where the control variable k serves to index the semiconductor switches shown—are each connected in a complementary manner. This means that one of the two switches is always open and the other closed, so that the semiconductor switches $T_{k1}$, $T_{k2}$ form a functionally connected pair of semiconductor switches $T_{k1}$, $T_{k2}$. In the case of the multilevel converter 1 under consideration, the switches $I_1$ and $I_2$ as well as $I_3$ and $I_4$ are of course also connected in a complementary manner.

The control, i.e., the opening and closing, of the semiconductor switches shown in FIG. 1 is carried out, as is usual in power electronics, by electrical control pulses in the form of electrical voltages, the pulse widths or pulse durations of which are changed according to a control method and are adapted to the requirements of a given situation. As explained earlier, the well-known pulse-width modulation (PWM) is particularly suitable as a control method, but other control methods can also be used, such as pulse-frequency modulation (PFM), which is known in power electronics. In order to implement control according to PWM or PFM in the case shown in FIG. 1, the aforementioned control pulses are determined in the control unit 2 and output by the control unit 2 to control the switches.

The control unit 2 can be implemented using microprocessor-based hardware, microcontrollers, and/or integrated circuits (ASIC, FPGA).

The control unit 2 in the present case picks up a target output voltage $u_{target}$ for the output voltage $u_{out}$. Since, as mentioned, the method according to the disclosure is not limited to the topology shown in FIG. 1, locations other than output A are also conceivable, where the output voltage $u_{out}$ to be set drops.

A selected set of semiconductor switches that are open at a point in time during the operation of the multi-level power converter 1, or, complementary thereto, a selected set of closed semiconductor switches, defines a switching pattern. A switching pattern is associated with the output of a voltage level assigned to the switching pattern at the output A of the multi-level power converter 1 at the corresponding point in time. By opening and closing the semiconductor switches, time signals of switching patterns can be generated during the operation of the multi-level power converter 1, from which—in the case shown in FIG. 1—time signals of the output voltage $u_{out}$ result, which in turn correspond to temporal sequences of the voltage levels 0, $$\pm u_{dc} \cdot \frac{1}{8},\ \pm u_{dc} \cdot \frac{2}{8},\ \pm u_{dc} \cdot 3,\ \pm u_{dc} \cdot \frac{4}{8}$$

present in the 9-level power converter 1. Usually, the time signal of the output voltage $u_{out}$ is used to set a desired output voltage, for example a sinusoidal or a constant output voltage $u_{out}$.

In the design shown in FIG. 1, an output filter AF is connected to the output A of the multi-level power converter 1. However, the output filter AF is only optional and does not necessarily have to be present. The output voltage $u_{out}$ is applied to the output filter AF, which drives an output current $i_{out}$ flowing into the output filter AF. In the present case, the load current $i_L$, which subsequently supplies a load $Z_L$, leaves the output filter AF. It should be noted that instead of the load $Z_L$ an AC voltage source can also be given, for example an electrical grid. In general, input/output/source/ load can be interchanged at will; the topology according to the disclosure can shift power in both directions. The output filter AF is used to smooth the output voltage $u_{out}$ and output current $i_{out}$, but it can also be or include a known EMC (electromagnetic compatibility) filter. An example embodiment of an output filter AF is often given by a well-known LCL filter. In principle, output filters AF are used to suppress interference signals which are also generated by converters in addition to the actually desired time signals of output variables. It should be emphasized that the output filter AF is not a necessary prerequisite for implementing the present disclosure.

As discussed earlier, one of the characteristics of HANPC power converters, such as the 9-level power converter 1 shown in FIG. 1, is the fact that individual voltage levels can be implemented by a plurality of switching patterns. In the case of the multi-level power converter 1 from FIG. 1, the important voltage level 0V ("zero voltage level", $u_{out}$=0V) in particular can be realized in two ways, as shown in FIGS. 2a and 2b.

Figure 2A:
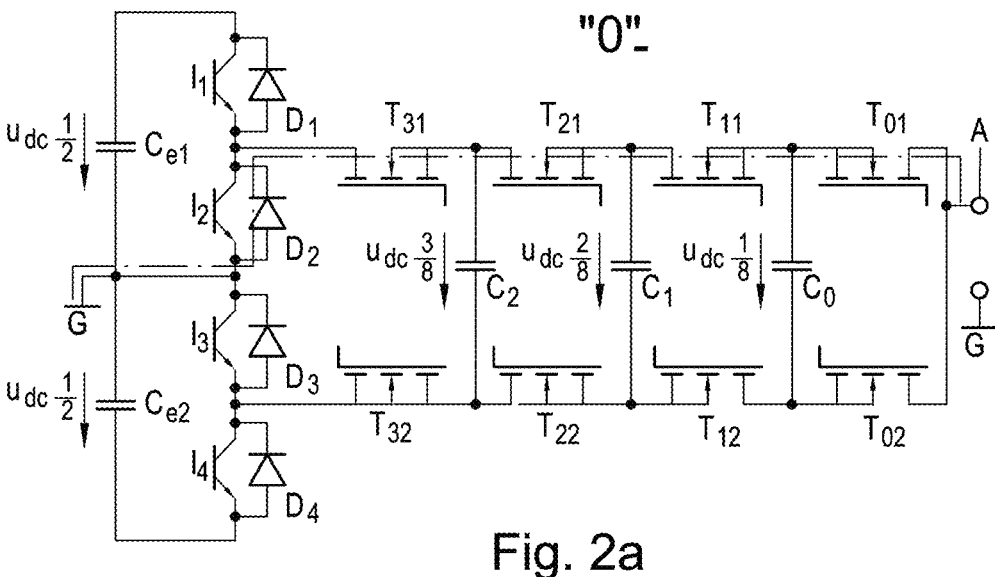
FIGS. 2a and 2b show two possible zero switching patterns.

In the case of FIG. 2a, the semiconductor switches 12, 14, $T_{31}$, $T_{21}$, $T_{11}$, $T_{01}$ marked by dot-dashed lines are closed, and the remaining semiconductor switches $I_1$, $I_3$, $T_{32}$, $T_{22}$, $T_{12}$, $T_{02}$ are open. The switching pattern realized by this constellation of open and closed switches is denoted by "0." in the following. It is obvious that the reference potential G is output to the output A via the path marked by dot-dashed lines through the 9-level power converter 1, so that there is no longer a potential difference between output A and the reference potential G and the voltage drop at output A disappears. The same applies to the situation shown in FIG. 2b, where the given semiconductor switches are connected in a complementary manner compared to FIG. 2a. FIG. 2b shows the switching pattern "0+", which is complementary to FIG. 2a, in the context of which the reference potential G is also output at the output A, but now via a path which is complementary to the path shown in FIG. 2a, which is also shown as dot-dashed lines.

Figure 2B:
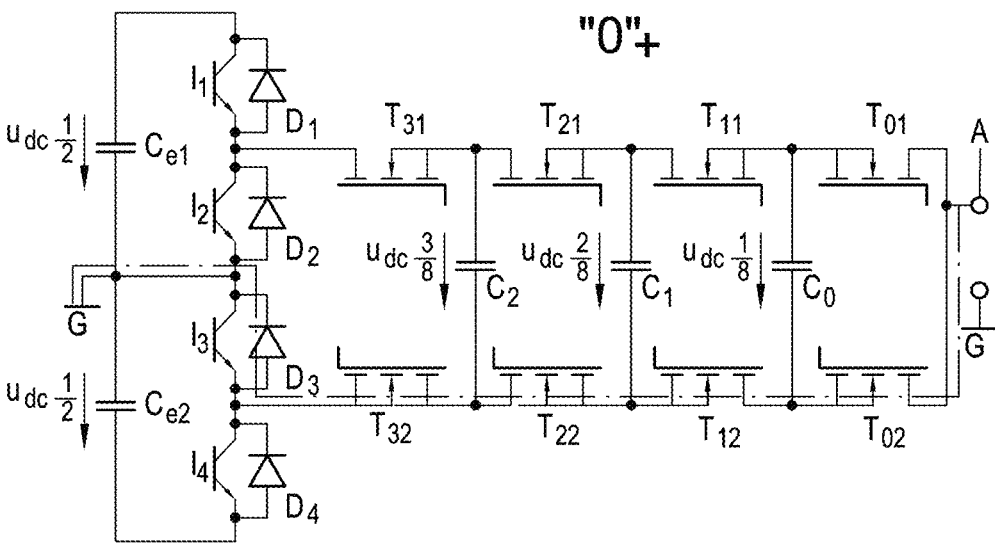

The switching patterns 0_ and 0+ shown in FIGS. 2a and 2b are of particular importance during operation of the 9-level power converter 1. Specifically, the switching pattern 0− is used to generate negative voltage-time areas, which are derived in particular from predefined negative output voltages, as part of a PWM, while the switching pattern 0+ is used to generate positive voltage-time areas in a predefined time interval. The reason for this choice arises from the fact that in the context of a PWM when using the switching pattern 0+ to generate positive output voltages $u_{out}$, in some cases a significantly smaller number of semiconductor switches provided in the 9-level power converter 1 have to be switched than if that switching pattern 0− would be used to implement positive output voltages $u_{out}$. The same applies vice versa to negative output voltages $u_{out}$, for the output of which the switching pattern 0− is used. For example, when switching between the switching pattern 0+ and a switching pattern which outputs the voltage level $u_{dc}\cdot\frac{1}{8}$ at output A, only the semiconductor switches $T_{01}$, $T_{02}$ can be switched. Starting from 0_, a transition to the voltage level $u_{dc}\cdot\frac{1}{8}$ would require significantly more switches to be opened and/or closed, which would lead to increased switching losses and is undesirable for this reason alone. A person skilled in the art of power electronics is familiar with these relationships.

Figure 3A:
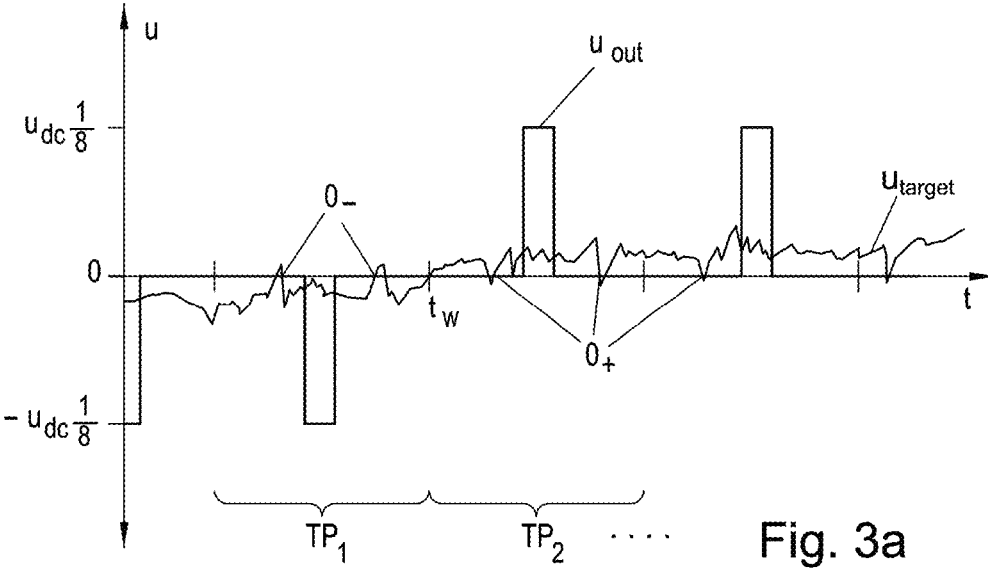
FIGS. 3a and 3b show time signals of an output voltage with zero crossings.

If, as shown in FIG. 3a, a target output voltage $u_{target}$ with a slightly negative voltage-time area is required in a first control period $TP_1$ of two consecutive control periods $TP_1$, $TP_2$, whereas a target output voltage $u_{target}$ with a slightly positive voltage-time area is required in the second control period $TP_2$, the voltage level of zero (0V) must always be output at the edges of the two control periods $TP_1$, $TP_2$. Since in the first control period $TP_1$ a slightly negative value is required, which is implemented using the first zero switching pattern 0_, whereas in the second control period $TP_2$ a slightly positive value is required, which is implemented using the second zero switching pattern 0+, a change from the first zero switching pattern 0_ to the second zero switching pattern 0+ is required at the boundary between the aforementioned control periods.

Switching between the zero switching patterns 0_ and 0+ requires, as mentioned, synchronous switching of all semiconductor switches provided in the multi-level power converter; however, this cannot be guaranteed in practice due to component variance and other dirt effects. Such transitions can result in outliers in the generated output voltage $u_{out}$, particularly due to different switching times of the input switches $I_1$, $I_2$, $I_3$, $I_4$ (usually IGBTs) and the other semiconductor switches $T_{01}$, $T_{02}$, ... $T_{31}$, $T_{32}$ (usually MOS-FETs), as explained earlier.

Figure 3B:
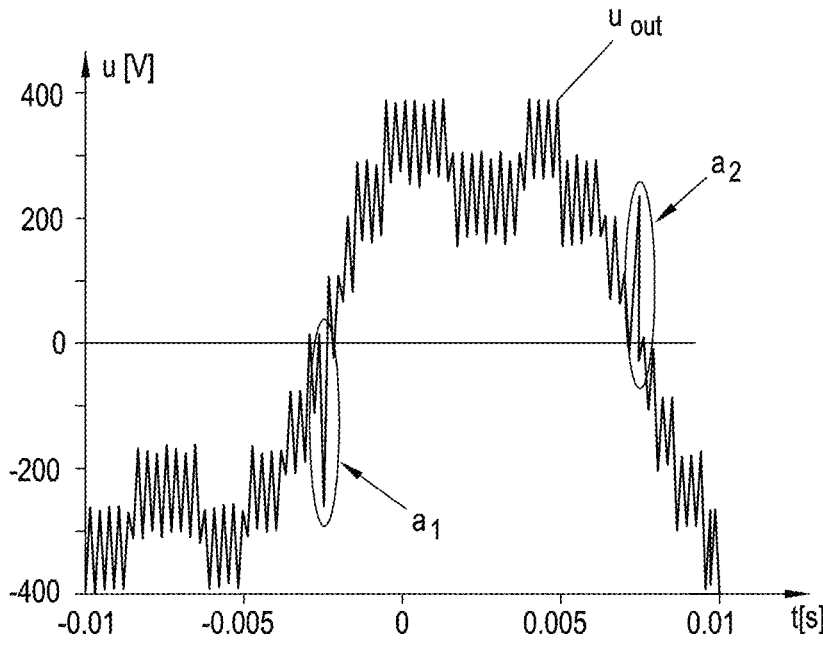

As can be seen from FIG. 3a, the target output voltage $u_{target}$ in question is not given in the form of a smooth time signal, but in the form of a varying, fluctuating time signal. In practice, a common reason for such time signals of target output voltage $u_{target}$ is that the target output voltage $u_{target}$ is predefined as a manipulated variable by higher-level controllers, wherein these higher-level controllers often control noisy variables, such as a noisy load current $i_L$. If no countermeasures are taken, many sign changes can occur in practice, even within short periods of time, which must be avoided for the reasons mentioned. A measurement of an output voltage $u_{out}$, which was generated by means of a multi-level power converter 1 according to FIG. 1 and which has such outliers $a_1$, $a_2$, is shown in FIG. 3b.

In order to keep the number of zero crossings with switching pattern changes and thus the number of outliers in the generated output voltage $u_{out}$ low, the so-called clamping method is used in the state of the art, which is described in more detail in FIGS. 4a and 4b. In conventional clamping according to the state of the art, a predefined target output voltage $u_{out}$ in a clamping range CB is replaced by the value zero ("clamped to 0"). In the case shown in FIG. 4a, the range limits $-u_{clamp}$, $u_{clamp}$ are predefined in order to determine the clamping range CB, resulting in a clamping range CB that is symmetrical about the value $u_{target}$=0V. An asymmetrical definition of the clamping range CB is also possible, with according to the absolute value differing range limits. The range limits $-u_{clamp}$, $u_{clamp}$ are usually selected to be small in comparison to the supply voltage $u_{dc}$, for example, in an order of magnitude or $$\pm u_{clamp} = \pm \frac{1}{20} u_{dc}, \pm u_{clamp} = \frac{1}{50} \pm u_{dc}, \text{ or } \pm u_{clamp} = \frac{1}{100} \pm u_{dc}.$$

According to the state of the art, instead of the target output voltage $u_{out}$ in the clamping range CB, the value zero is used to determine the sequence of voltage levels to be output. In this way, a sequence of several sign changes due to a fluctuation between slightly negative and slightly positive values is prevented, substantially by simply ignoring the actual graph of the target output voltage $u_{out}$ in the clamping range CB. The signal $u_{PWM}$ generated by replacing the values of the target output voltage $u_{out}$ in the clamping range CB is subsequently used in the control unit 2 to determine the control pulses required to operate the multi-level power converter 1, for example, as part of a PWM. Typical time signals of a target output voltage $u_{out}$ and of a resulting voltage $u_{PWM}$, as can occur in the context of conventional clamping according to the state of the art, are shown in FIG. 4b.

If there is now a transition of a target output voltage $u_{target}$ from a negative value below $-u_{clamp}$ to a positive value above $u_{clamp}$, the clamping range CB is passed through. Here, too, according to the above statements, a switch between the zero switching patterns $0_-$ and $0_+$ has to take place, since, as in the cases described above, slightly positive and slightly negative voltage values prevail adjacent to the clamping range CB, for the implementation of which the different zero switching patterns $0_-$ and $0_+$ have to be used. In order to ensure this change of zero switching patterns $0_-$ and $0_+$, the state of the art usually uses a hysteresis graph, as shown in FIG. 4c. The zero switching patterns $0_-$ and $0_+$ to be used in a PWM are plotted on the y-axis of FIG. 4c above the values of the target output voltage $u_{target}$ arranged on the x-axis. According to the hysteresis graph shown, when the clamping range CB is passed through, a change from the zero switching pattern $0_-$ to the zero switching pattern $0_+$ takes place exactly when the hysteresis threshold value $u_{clamp}/2$ is passed, starting from a value of the target output voltage $u_{target}$ below $u_{clamp}/2$. Conversely, a change from the zero switching pattern $0_-$ to the zero switching pattern $0_+$ only takes place when the hysteresis threshold value $-u_{clamp}/2$ is passed starting from a value of the target output voltage $u_{target}$ that is above $u_{clamp}/2$. In this way, it is ensured that, on the one hand, a switching pattern change between $0_-$ and $0_+$ only takes place when the clamping range CB is passed through without a reversal or change of direction, and that, on the other hand, a fluctuating target output voltage $u_{target}$ does not lead to a sequence of a plurality of switching pattern changes within a short time. It should be noted at this point that values other than half of the range limits $-u_{clamp}$, $u_{clamp}$ are also selected for the hysteresis threshold values mentioned. Specifically, a choice of $\pm u_{clamp}/3$ or $\pm 2 \cdot u_{clamp}/3$ would also be conceivable, or an asymmetrical choice such as $u_{clamp}/3$ and $-u_{clamp}/2$, as long as the hysteresis threshold values are according to the absolute value smaller than the range limits $-u_{clamp}$, $u_{clamp}$.

As mentioned, the procedure shown in FIGS. 4a-4c is accompanied by an inevitable distortion of the required target output voltage $u_{out}$, since the described replacement of values of the target output voltage $u_{out}$ lying in the clamping range CB is carried out in any case as soon as the target output voltage $u_{out}$ enters the clamping range CB. In the context of the present disclosure, it has been recognized in this context that replacing values of a predetermined target output voltage $u_{out}$ is not absolutely necessary in every scenario. In particular, the disclosure avoids the distortion of the predefined target output voltage $u_{out}$ which is unavoidable within the context of the state of the art; this is described below with reference to FIGS. 5a-5c.

According to the disclosure, a lower threshold value $u_{clamp-}$, an upper threshold value $u_{clamp+}$ above the lower threshold value $u_{clamp-}$, and an inflection value $u_0$ between the lower threshold value $u_{clamp-}$ and the upper threshold value $u_{clamp+}$ are also determined for the predefined target output voltage $u_{target}$, as shown in FIGS. 5a-5c. In the situations shown in FIGS. 5a-5c, the inflection value $u_0$ corresponds to the value zero, and $u_0$=0V. Of course, a value other than zero can also be provided for the inflection value $u_0$. According to the disclosure, in the event that the predefined time signal of the target output voltage $u_{target}$ passes the inflection value $u_0$ at a first inflection time point $t_{W1}$, passes the inflection value $u_0$ a further time at a second inflection time point $t_{W2}$ subsequent to the first inflection time point $t_{W1}$ and, between the first inflection time point $t_{W1}$ and the second inflection time point $t_{W2}$, passes neither the lower threshold value $u_{clamp-}$ nor the upper threshold value $u_{clamp+}$ nor the inflection value $u_0$, a clamping mode CM of the multi-level power converter 1 is activated as of the second inflection time point $t_{W2}$. Only in the event that the clamping mode CM of the multi-level power converter 1 is active, the inflection value $u_0$ is used instead of the time signal of the target output voltage $u_{target}$ to determine the sequence of voltage levels which is output by the switching of the plurality of semiconductor switches Ti at the output A of the multi-level power converter 1.

As in the scenario described with reference to FIGS. 4a-4c, the threshold values $u_{clamp-}$ and $u_{clamp+}$ can have the same absolute value but a different sign, and thus in the event of an inflection point $u_0$ being selected to be equal to the value zero, can define a range that is arranged symmetrical around the inflection point $u_0$. A symmetrical or an asymmetrical definition both around an inflection point $u_0$ selected to be equal to the value zero and around an inflection point $u_0$ different from zero are of course also conceivable.

In contrast to the conventional clamping according to the state of the art, within the scope of the disclosure there is no longer clamping in every case, that is, the predefined target input voltage $u_{target}$ is no longer replaced by another value in every case, but only in the case of repeated sign changes between which the threshold values $u_{clamp+}$ and $u_{clamp-}$ are not exceeded. This procedure is based on the insight that at least one switching pattern change must be carried out in the event of a zero crossing. Thus, if there is a time signal of a target output voltage $u_{target}$ which requires exactly one switching pattern change, it is not necessary to change the time signal, as this at least one switching pattern change cannot be avoided anyway. It is therefore not necessary to perform a clamping in every case, as in the state of the art, and in particular not in scenarios where the value zero is only passed once and no further sign changes subsequently take place. According to the disclosure, clamping is only activated when it is really needed, specifically when several consecutive sign changes would occur.

In order to exit clamping mode CM again, it is detected in an advantageous manner whether the predefined time signal of the target output voltage $u_{target}$ passes the inflection time point $u_0$ a further time after the second inflection time point $t_{W2}$ or passes the lower threshold value $u_{clamp-}$ or the upper threshold value $u_{clamp+}$ after the second inflection time point $t_{W2}$. In this case, the clamping mode CM is immediately deactivated again, and the time signal of the target output voltage $u_{out}$ is used again for control. In this way, there is also an improvement within the threshold values $u_{clamp+}$ and $u_{clamp-}$ compared to conventional clamping according to the state of the art, as in this way the correct target output voltage $u_{target}$ is used for control, at least in sections, even in the case of multiple consecutive sign changes. In any case, however, the predefined time signal of the target output voltage $u_{target}$ is used to determine the sequence of voltage levels which is output at output A of the multi-level power converter 1 when the target output voltage $u_{target}$ is below the lower threshold value $u_{clamp-}$ or above the upper threshold value $u_{clamp+}$.

The effect of the method according to the disclosure on time signals of a predefined target output voltage $u_{target}$ is shown in FIGS. 5a-5c. In the signal graph shown in FIG. 5a, the target output voltage $u_{target}$ passes from the negative to the positive range, specifically after the target output voltage $u_{target}$ passes the inflection value $u_0$ at the inflection time point $t_{w1}$, and then remains in the positive range. The positive effect of the disclosure is particularly clear in the case shown in FIG. 5a, as the predefined time signal of the target output voltage $u_{target}$ does not undergo any change.

A situation in which an input signal has a plurality of sign changes is shown in FIG. 5b. The section between $t_{w2}$ and $t_{w3}$ is that part of the target output voltage $u_{target}$ which is overridden according to the disclosure, i.e., the values of which are replaced by the inflection value $u_0$. In this way, a sign change occurs at the inflection time point $t_{w1}$, and further sign changes that would take place if there were no measures at the inflection time points $t_{w2}$ and $t_{w3}$ are avoided.

Another scenario which is relevant in the context of the present disclosure is shown in FIG. 5c. The target output voltage $u_{target}$ reverses shortly after a first zero crossing at a first inflection time point $t_{w1}$ and crosses the zero line a further time at a second inflection time point $t_{w2}$. At the second inflection time point $t_{w2}$, there is another section of the target output voltage $u_{target}$, in which the target output voltage $u_{target}$ is overridden as in FIG. 5b.

Within the scope of the disclosure, it must therefore be taken into account how many sign changes a target output voltage $u_{target}$ has already made in the past and whether, between the past sign changes, said voltage has exceeded or fallen below the threshold values $u_{clamp+}$ and $u_{clamp-}$ and the inflection value $u_0$.

A particularly advantageous variant for implementing the present disclosure, for example in a control unit 2 as shown in FIG. 1, in which this information can be easily taken into account and in which the switching pattern changes, which are also unavoidable within the scope of the disclosure, can be carried out in an orderly manner, is shown in FIG. 6.

Specifically, FIG. 6 shows a state machine including four states: state a (solid line) shown in the bottom left is activated when a negative target output voltage $u_{target}$ below the lower threshold value $u_{clamp-}$ is present. State b (dashed line) shown at the top right is activated complementary to state a when a positive target output voltage $u_{target}$ above the upper threshold value $u_{clamp+}$ is given. is pr States c and d are used for handling sign changes. Specifically, state c (dotted line) is activated when the negative state a is exited by the target output voltage $u_{target}$ reaching or passing (in this case exceeding) the inflection value $u_0$. In contrast, state d is activated in the opposite case when the positive state b is exited by the target output voltage $u_{target}$ reaching or passing (in this case falling below) the inflection value $u_0$. The core idea of the state machine shown in FIG. 6 is, on the one hand, to only carry out a switching pattern change when states c or d are entered starting from states a or b. On the other hand, the actually predefined target output voltage $u_{target}$ is only replaced (clamped) by the inflection value $u_0$ if a further sign change occurs within states c or d. In this way, the disclosure can be implemented efficiently and without unnecessarily tying up computing capacity.

To detect the aforementioned transitions, the predefined target output voltage $u_{target}$ is compared with the inflection value $u_0$ and the threshold values $u_{clamp-}$, $u_{clamp+}$. A change from a to b (or vice versa) and from c to d (or vice versa) is not permitted and is not intended. By means of the state machine shown in FIG. 6, the zero crossing is carried out in such a way that conventional clamping only takes place if multiple sign changes would otherwise occur in the output voltage.

An alternative way of representing the state machine from FIG. 6 is shown in FIGS. 7a and 7b. Specifically, FIGS. 7a and 7b use characteristic graphs comparable to the hysteresis graph shown in FIG. 4b. The different representation of the sections of the characteristic graphs from FIGS. 7a and 7b are used to connect the characteristic graphs from FIGS. 7a and 7b with the states of the state machine from FIG. 6 (state a: solid line, state b: dashed line, state c: dotted line, state d: dot-dashed line). In FIG. 7b, in the course of the vertical sections, switching pattern changes occur between $0_-$ and $0_+$ and vice versa. As part of the characteristic graphs shown in FIG. 7b, for example, a switching pattern change between $0_-$ and $0_+$ is carried out when a change is made from state a (solid line) to state c (dotted line).

Based on the representation in FIG. 7b, various further advantageous embodiments of the disclosure can be derived. In particular, the ascending and descending vertical branches that coincide around the inflection value $u_0$ can be shifted horizontally from one another, resulting in a total of two hysteresis graphs that are pushed into one another.

Figure 8:
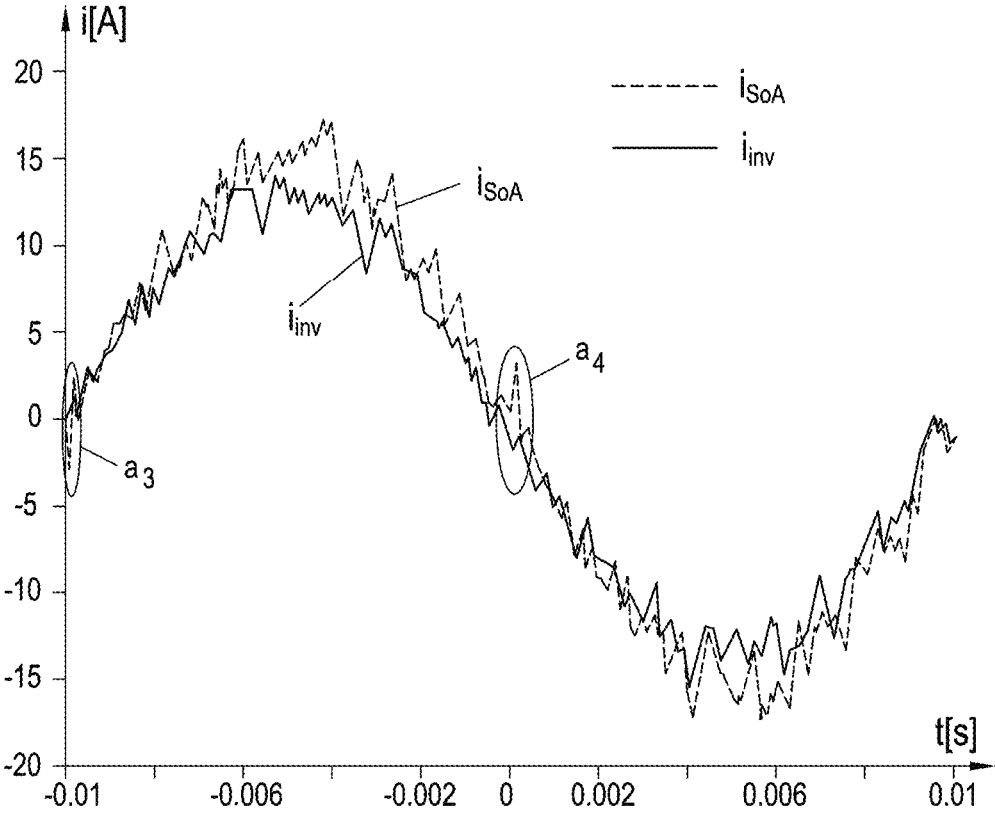
FIG. 8 shows results achieved using the method according to the disclosure and using a method according to the state of the art.

Finally, FIG. 8 shows a comparison of measured currents $i_{SoA}$, $i_{inv}$ which were generated, in the first case, using a conventional clamping method according to the state of the art (SoA), and, in the second case, using the method according to the disclosure (inv). In conventional clamping, a clear interference can be seen at the zero crossing in the sections highlighted by circles, specifically in the form of the outliers $a_3$ and $a_4$. The disclosure almost completely eliminates this interference. As a direct consequence, EMC interference is reduced, with the result that, inter alia, it is easier to comply with the usual EMC standards, and, in particular, smaller and more cost-effective output filters AF can be used.

What is claimed is:

1. A method for operating a multi-level power converter, wherein a temporal sequence of at least three voltage levels which can be output at an output of the multi-level power converter is determined from a predefined time signal of a target output voltage and is output at the output of the multi-level power converter by switching a plurality of semiconductor switches of the multi-level power converter, wherein a lower threshold value, an upper threshold value above the lower threshold value, and an inflection value between the lower threshold value and the upper threshold value are determined, wherein, in the event that the predefined time signal of the target output voltage passes the inflection value at a first inflection time point, passes the inflection value a further time at a second inflection time point subsequent to the first inflection time point and, between the first inflection time point and the second inflection time point, passes neither the lower threshold value nor the upper threshold value nor the inflection value, a clamping mode (CM) of the multi-level power converter is activated as of the second inflection time point, and wherein, in the clamping mode (CM) of the multi-level power converter, the inflection value is used instead of the time signal of the target output voltage to determine the sequence of the at least three voltage levels which is output at the output of the multi-level power converter by switching the plurality of semiconductor switches.

2. The method according to claim 1, wherein the clamping mode (CM) is deactivated and the predefined time signal of the target output voltage is used again in order to determine the sequence of the at least three voltage levels which is output at the output of the multi-level power converter when the predefined time signal of the target output voltage passes the inflection value a further time after the second inflection time point or when the predefined time signal of the target output voltage passes the lower threshold value or the upper threshold value after the second inflection time point.

3. The method according to claim 1, wherein the predefined time signal of the target output voltage is used to determine the sequence of the at least three voltage levels which is output at the output of the multi-level power converter when the target output voltage is below the lower threshold value or above the upper threshold value.

4. The method according to claim 1, wherein, at a current point in time during operation of the multi-level power converter, the clamping mode (CM) is activated and the inflection value is used to determine the sequence of the at least three voltage levels of the multi-level power converter which is output by the switching of the plurality of semiconductor switches at the output of the multi-level power converter if a number of inflection time points between the current point in time and the last point in time at which the target output voltage was greater than the upper threshold value or less than the lower threshold value is even-numbered.

5. The method according to claim 1, wherein the inflection value corresponds to the value zero.

6. The method according to claim 1, wherein the inflection value is selected as an arithmetic mean between the lower threshold value and the upper threshold value.

7. The method according to claim 1, wherein the inflection value is realized by a first zero switching pattern of the plurality of semiconductor switches of the multi-level power converter, and by a second zero switching pattern of the plurality of semiconductor switches of the multi-level power converter.

8. The method according to claim 7, wherein the first zero switching pattern is used to output the inflection value if a target output voltage, instead of which the inflection value is used to determine an output sequence of the at least three voltage levels, is above the inflection value, and wherein the second zero switching pattern is used to output the inflection value if the target output voltage, instead of which the inflection value is used to determine the output sequence of the at least three voltage levels, is below the inflection value.

9. The method according to claim 1, wherein a method for pulse-width modulation (PWM) or a method for pulse-frequency modulation (PFM) is used to determine the temporal sequence of the at least three voltage levels of the multi-level power converter which can be output at the output of the multi-level power converter.

10. The method according to claim 1, wherein a state machine with at least four states a, b, c, d is provided, wherein state a is activated when a negative target output voltage below the lower threshold value is present, wherein state b is activated when a positive target output voltage above the upper threshold value is present, wherein state c is activated when the negative state a is exited by the target output voltage reaching or passing the inflection value, and wherein state d is activated when the positive state b is exited by the target output voltage reaching or passing the inflection value, and wherein the clamping mode (CM) is activated and the predefined target output voltage is replaced by the inflection value when the target output voltage passes the inflection value a further time within the states c or d.

11. A multi-level power converter comprising a control unit, an input, an output, and a plurality of semiconductor switches, wherein the control unit is designed to determine, from a predefined time signal of a target output voltage, a temporal sequence of at least three voltage levels which can be output at an output of the multi-level power converter, and to control the plurality of semiconductor switches of the multi-level power converter as a function of the determined sequence of voltage levels in order to output the determined sequence of voltage levels at the output of the multi-level power converter, wherein a lower threshold value, an upper threshold value above the lower threshold value, and an inflection value between the lower threshold value and the upper threshold value are stored in the control unit, wherein the control unit is designed to, in the event that the predefined time signal of the target output voltage passes the inflection value at a first inflection time point, passes the inflection value a further time at a second inflection time point subsequent to the first inflection time point and, between the first inflection time point and the second inflection time point, passes neither the lower threshold value nor the upper threshold value nor the inflection value, activate a clamping mode (CM) of the multi-level power converter as of the second inflection time point, wherein the control unit is designed to, in the clamping mode (CM) of the multi-level power converter, use the inflection value instead of the time signal of the target output voltage to determine the sequence of the at least three voltage levels which is output by the switching of the plurality of semiconductor switches at the output of the multi-level power converter.

12. The multi-level power converter (1) according to claim 11, wherein a state machine with at least four states a, b, c, d is provided in the control unit, wherein the control unit is designed to activate state a when a negative target output voltage below the lower threshold value is present, wherein the control unit is designed to activate state b when a positive target output voltage above the upper threshold value is present, wherein the control unit is designed to activate state c when the negative state a is exited by the target output voltage reaching or passing the inflection value, wherein the control unit is designed to activate state d when the positive state b is exited by the target output voltage reaching or passing the inflection value, and wherein the control unit is designed to activate the clamping mode (CM) and to replace the predefined target output voltage with the inflection value if the target output voltage passes the inflection value a further time within the states c or d.

* * * * *